United States Patent
Ishiwari (10) Patent No.: US 11,231,699 B2
(45) Date of Patent: Jan. 25, 2022

(54) PROGRAM ANALYSIS DEVICE

(71) Applicant: FANUC CORPORATION, Yamanashi (JP)

(72) Inventor: Hisateru Ishiwari, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/082,011

(22) Filed: Oct. 28, 2020

(65) Prior Publication Data

US 2021/0149379 A1 May 20, 2021

(30) Foreign Application Priority Data

Nov. 19, 2019 (JP) .............................. JP2019-208425

(51) Int. Cl.
*G05B 19/418* (2006.01)

(52) U.S. Cl.
CPC . *G05B 19/41825* (2013.01); *G05B 19/41805* (2013.01); *G05B 19/41865* (2013.01)

(58) Field of Classification Search
CPC ........ G05B 19/41825; G05B 19/41805; G05B 19/41865; G05B 2219/36304; G05B 2219/36301; G05B 19/4068; G05B 19/408; G05B 19/416; G05B 19/4093; G05B 19/4155; Y02P 90/02

USPC ........................................................ 700/159
See application file for complete search history.

(56) References Cited

U.S. PATENT DOCUMENTS

| | | | |
|---|---|---|---|
| 2017/0205804 A1* | 7/2017 | Kuroki | G05B 13/021 |
| 2017/0308042 A1* | 10/2017 | Kurasawa | G05B 13/02 |
| 2018/0264647 A1* | 9/2018 | Sato | G05B 19/4062 |

FOREIGN PATENT DOCUMENTS

| | | |
|---|---|---|
| JP | 2017126199 A | 7/2017 |
| JP | 2017194904 A | 10/2017 |

* cited by examiner

*Primary Examiner* — Kenneth M Lo
*Assistant Examiner* — Mohammed Shafayet
(74) *Attorney, Agent, or Firm* — Hauptman Ham, LLP (57) ABSTRACT

A program analysis device divides a machining program into processes, obtains a command speed from the divided machining program for each process, and measures an actual speed of an axis for each process obtained when machining based on the machining program is performed. Then, the program analysis device calculates an integral value of the difference between the command speed and the actual speed, rearranges the order of the processes based on the calculated integral value, and creates screen data for displaying the sorted processes in order. Provided is an assistive technology for effectively improving the difference between the command speed of the machining program and the actual speed of an axis movement of a machine tool, based on the screen data.

4 Claims, 7 Drawing Sheets

| No | SHAPE PATTERN OF INTEGRAL VALUE | ADVICE |
|---|---|---|
| 1 | | ・ADVICE A-1<br>・ADVICE A-2<br>… |
| 2 | | ・ADVICE B-1<br>・ADVICE B-2<br>… |
| 3 | | ・ADVICE C-1<br>・ADVICE C-2<br>… |
| … | … | … |

PROGRAM ANALYSIS DEVICE

RELATED APPLICATIONS

The present application claims priority to Japanese Patent Application Number 2019-208425 filed Nov. 19, 2019, the disclosure of which is hereby incorporated by reference herein in its entirety.

BACKGROUND OF THE INVENTION

Field of the Invention

The present invention relates to a program analysis device.

Description of the Related Art

A controller for controlling industrial machines such as machine tools and injection molding machines controls the operations of the industrial machines according to a program for control created by an operator. In creating a machining program used by the controller to control a machine tool, the operator settles command speeds of axes based on the specifications of tools used for machining, required surface roughness of a machined workpiece, and the like.

For the various reasons described below, however, the feed speed during actual machining sometimes does not comply with a command from the machining program.

1) Inertia and acceleration and deceleration of the machine tool or its motor,
2) Command surpassing the performance of the hardware of the controller,
3) Machining path with frequent acceleration and deceleration, and
4) Mistake in upper limit speed setting.

In order to eliminate these various problems, the operator is attempting to reduce the cycle time by approximating the feed speed to the speed commanded by the program by, for example, devising the way of writing the machining program. A technology for ascertaining differences between command speeds and actual speeds is disclosed in Japanese Patent Application Laid-Open No. 2017-126199 and Japanese Patent Application Laid-Open No. 2017-194904 and the like.

In modifying the machining program, the operator should ascertain not only a command unit but also that process of the machining program which suffers a divergence, if any, between an actual speed and a command speed from the machining program. Moreover, since modification of all the processes of the machining program is very laborious, the machining program is expected to be effectively modified for those processes which can enjoy high modification effects, if possible. However, it is difficult to entirely ascertain the degrees of improvement effects for the individual processes.

SUMMARY OF THE INVENTION

Accordingly, there is a demand for an assistive technology for effectively improving the difference between a command speed from a machining program and an actual speed of an axis movement of a machine tool.

A program analysis device according to the present invention obtains the command speed (synthetic speed of axes) from the machining program and the actual speed of the axis movement of the machine tool. Then, the program analysis device obtains integral values of differences between the obtained command and actual speeds and displays processes in the descending order of the values after dividing the machining program for each process.

One aspect of the program analysis device of the present invention is configured to obtain a difference between a command speed commanded by a machining program for an axis of a machine to be controlled and an actual speed of the axis obtained when the machining program is executed, for each process as a specified machining unit composed of a plurality of blocks in the machining program, and includes a process division unit configured to divide the machining program into processes, a command speed calculation unit configured to obtain the command speed from the machining program for each of the processes obtained by the division by the process division unit, an actual speed measurement unit configured to measure the actual speed of the axis for each of the processes obtained when machining based on the machining program is performed, a difference calculation unit configured to calculate an integral value of the difference between the command speed obtained by the command speed calculation unit and the actual speed measured by the actual speed measurement unit, a process sorting unit configured to rearrange the order of the processes based on the integral value of the difference between the command speed and the actual speed calculated by the difference calculation unit, and a result screen creation unit configured to create screen data for displaying in order the processes sorted by the process sorting unit.

The result screen creation unit may display the integral value of the difference between the command speed and the actual speed for each process in the form of a graph in displaying in order the processes sorted by the process sorting unit.

The program analysis device may further include a simulation unit configured to simulate a movement of the axis of the machine caused when the machining program is executed, and the actual speed measurement unit may regard the speed of the axis calculated by the simulation unit as the actual speed.

The program analysis device may further include an advice creation unit configured to create an advice for a point of improvement of the machining program, based on the integral value of the difference between the command speed and the actual speed for each process in the form of a graph created by the result screen creation unit.

The program analysis device according to the present invention, having the structure described above, enables an operator to ascertain processes with great effects of modification at a glance.

DETAILED DESCRIPTION OF THE PREFERRED EMBODIMENTS

Figure 1:
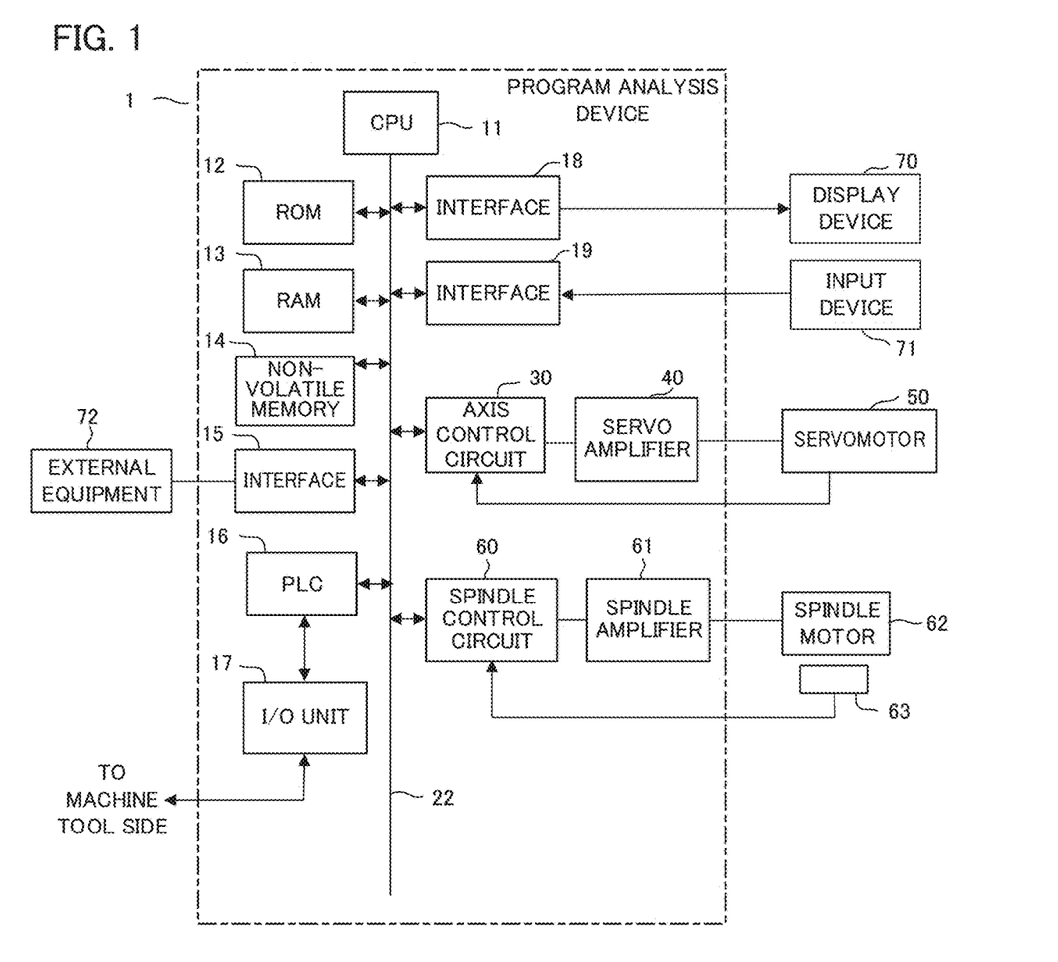
FIG. 1 is a schematic hardware configuration diagram of a program analysis device according to one embodiment.

FIG. 1 is a schematic hardware configuration diagram showing principal parts of a program analysis device according to one embodiment of the present invention.

A program analysis device 1 of the present invention can be implemented as a controller for controlling, for example, a machine tool. Moreover, the program analysis device 1 of the present invention can be mounted on a personal computer, which is attached to the controller for controlling the machine tool, or a personal computer, cell computer, fog computer, or cloud server connected to the controller through a wired/wireless network. In the embodiment of the present invention described below, the program analysis device 1 is mounted on the controller for controlling the machine tool.

A CPU 11 of the program analysis device 1 according to the present embodiment is a processor for generally controlling the program analysis device 1. The CPU 11 reads out a system program stored in a ROM 12 via a bus 22 and controls the entire program analysis device 1 according to this system program. A RAM 13 is temporarily loaded with temporary calculation data and display data, various externally input data, and the like.

A non-volatile memory 14 is composed of, for example, a memory, SSD (solid state drive), or the like backed up by a battery (not shown) and its storage state can be maintained even when the program analysis device 1 is switched off. The non-volatile memory 14 stores data and machining programs read from external equipment 72 through an interface 15, data and machining programs input through an input device 71, various data acquired from the machine tool, and the like. The data and machining programs stored in the non-volatile memory 14 may be developed in the RAM 13 during execution and use. Moreover, various system programs such as conventional analysis programs are written in advance in the ROM 12.

The interface 15 is an interface for connecting the CPU 11 of the program analysis device 1 and the external equipment 72, e.g., a USE device. For example, machining programs, parameters, and the like used for the control of the machine tool can be read from the side of the external equipment 72. Moreover, the machining programs, parameters, and the like edited in the program analysis device 1 can be stored into external storage means through the external equipment 72. A PLC (programmable logic controller) 16 outputs signals for control to the machine tool and its peripheral devices (e.g., a tool changer, an actuator such as a robot, sensors attached to the machine tool, etc.) through an I/O unit 17, based on a sequence program built in the program analysis device 1. Moreover, the PLC 16 receives signals from various switches of a control panel on the main body of the machine tool, its peripheral devices, and the like, performs necessary signal processing, and then delivers the signals to the CPU 11.

Data and the like obtained as a result of execution of the individual data, machining programs, system programs, and the like read onto the memory are output through an interface 18 to and displayed on the display device 70. Moreover, the input device 71, which is composed of a keyboard, pointing device, and the like, delivers commands, data, and the like based on a worker's operation to the CPU 11 through an interface 19.

An axis control circuit 30 for controlling the axes of the machine tool receives a movement command amount for an axis from the CPU 11 and outputs a command for the axis to a servo amplifier 40. On receipt of this command, the servo amplifier 40 drives a servomotor 50 for moving each of the axes of the machine tool. The axis servomotor 50 has a position/speed detector built-in. The servomotor 50 feeds back a position/speed feedback signal from the position/speed detector to the axis control circuit 30, thereby performing position/speed feedback control. In the hardware configuration diagram of FIG. 1, the axis control circuit 30, servo amplifier 40, and servomotor 50 are each shown as being only one in number. Actually, however, these elements are provided in a number corresponding to the number of axes provided in the machine tool to be controlled. In case where the machine tool to be controlled is a conventional one, for example, three sets of axis control circuits 30, servo amplifiers 40, and servomotors 50 are provided for relatively moving a workpiece and a spindle fitted with a tool in the directions of three straight axes (X-, Y-, and Z-axes).

A spindle control circuit 60 receives a spindle rotation command and outputs a spindle speed signal to a spindle amplifier 61. On receipt of this spindle rotation signal, the spindle amplifier 61 causes a spindle motor 62 of the machine tool to rotate at a commanded rotational speed, thereby driving the tool. The spindle motor 62 is coupled with a position coder 63. The position coder 63 outputs feedback pulses in synchronism with the rotation of the spindle and the feedback pulses are read by the CPU 11.

Figure 2:
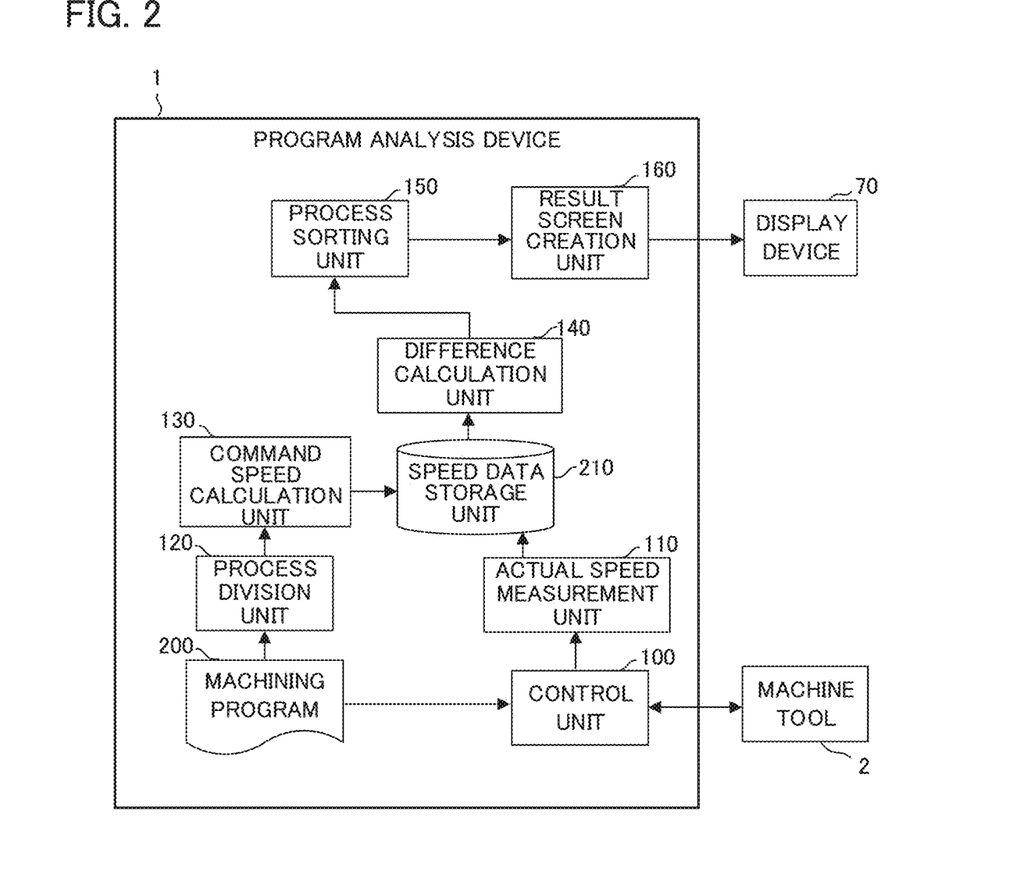
FIG. 2 is a schematic functional block diagram of a program analysis device according to a first embodiment.

FIG. 2 is a schematic block diagram showing functions of a program analysis device 1 according to a first embodiment of the present invention.

The individual functions of the program analysis device 1 according to the present embodiment are implemented as the CPU 11 of the program analysis device 1 shown in FIG. 1 executes the system program and controls the operations of the individual parts of the program analysis device 1.

The program analysis device 1 of the present embodiment includes a control unit 100, actual speed measurement unit 110 process division unit 120, command speed calculation unit 130, difference calculation unit 140, process sorting unit 130, and result screen creation unit 160. Moreover, a machining program 200 acquired from the input device 71, external equipment 72, and the like are previously stored in the RAM 13 or the non-volatile memory 14 of the program analysis device 1. Also, the RAM 13 or the non-volatile memory 14 of the program analysis device 1 is provided in advance with a speed data storage unit 210 as an area for storing a command speed commanded by the machining program 200 and an actual speed of an axis obtained when a machine tool 2 is controlled based on the machining program 200.

The control unit 100 is implemented as the CPU 11 of the program analysis device 1 shown in FIG. 1 executes the system program read out from the ROM 12 and arithmetic processing mainly by the CPU 11 using the RAM 13 and the non-volatile memory 14 and control processing of individual parts of the machine tool 2 using the axis control circuit 30, spindle control circuit 60, and PLC 16 are performed. The control unit 100 analyzes the blocks of the machining program 200 and, based on the result of this analysis, controls the individual parts of the machine tool 2.

If a block of the machining program 200 issues a command to move the axes of the machine tool 2, for example, the control unit 100 generates movement command data according to the command from the block and outputs the generated movement command data to the servomotor 50. Moreover, if the block of the machining program 200 issues a command to rotate the spindle of the machine tool 2, for example, the control unit 100 generates spindle rotation command data according to the command from the block and outputs the generated spindle rotation command data to the spindle motor 62. Furthermore, if the block of the machining program 200 issues a command to activate a peripheral device of the machine tool 2, for example, the control unit 100 generates a specified signal for operating the peripheral device and outputs the generated signal to the PLC 16. On the other hand, the control unit 100 acquires states of the servomotor 50 and the spindle motor 62 (including current values, positions, speeds, accelerations, torques, etc., of the motors) and uses the acquired data for each step of control processing.

The actual speed measurement unit 110 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The actual speed measurement unit 110 calculates a synthetic speed of the axes, based on the actual speeds of the axes acquired by the control unit 100, and stores the calculated synthetic speed of the axes as actual speed data into the speed data storage unit 210. The actual speed data includes at least the correspondence relation with the time elapsed since the execution of each block of the machining program 200.

The process division unit 120 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The process division unit 120 divides each block included in the machining program 200 for each process. In the present invention, the "process" means a specified machining unit composed of a plurality of blocks of the machining program 200.

The process division unit 120 may be designed so as to divide each block included in the machining program 200 for each process, with a tool change command described in the machining program 200 regarded as a division position, for example. The process division unit 120 may be designed so as to divide each block included in the machining program 200 for each process, with a specified auxiliary command (auxiliary command indicative of a specified division position of the machining program 200) described in the machining program 200 regarded as a division position, for example. The process division unit 120 may be designed so as to divide each block included in the machining program 200 for each process, with a comment of a specified form (comment indicative of a specified division position of the machining program 200) described in the machining program 200 by an operator regarded as a division position, for example. The process division unit 120 may be designed so as to divide each block included in the machining program 200 for each process, with a subprogram of the machining program 200 regarded as a process unit, for example. Otherwise, the process division unit 120 may be designed so as to divide each block included in the machining program 200 for each process, with a plurality of blocks that can be recognized by the operator as a series of blocks that forms a single machining shape on a workpiece regarded as a process unit.

The command speed calculation unit 130 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The command speed calculation unit 130 analyzes the machining program 200, obtains the synthetic speed of the axes commanded by the block of the machining program 200, and stores the obtained synthetic speed of the axes as command speed data into the speed data storage unit 210. The command speed calculation unit 130 obtains the synthetic speed of the axes based on a speed commanded by an F command from the block of the machining program 200, a predetermined default command speed, and the like, for example. The command speed data includes at least the correspondence relation with the time elapsed since the execution of each block of the machining program 200. Moreover, the command speed data is stored into the speed data storage unit 210 for each process divided by the process division unit 120. In this case, the command speed data may be designed so as to change within the process.

The difference calculation unit 140 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The difference calculation unit 140 calculates the difference between the actual speed and the command speed by the command from the block in the machining program 200, based on the command speed data and the actual speed data stored in the speed data storage unit 210. The difference calculation unit 140 calculates the difference between a command speed and an actual speed at each point in time after the execution of the machining program and calculates an integral value of the calculated difference for each process. The difference calculation unit 140 may calculate the integral value of the difference between the command speed and the actual speed for each process by calculating the integral values of the differences for the individual blocks and then adding up these values for each process.

Figure 3:
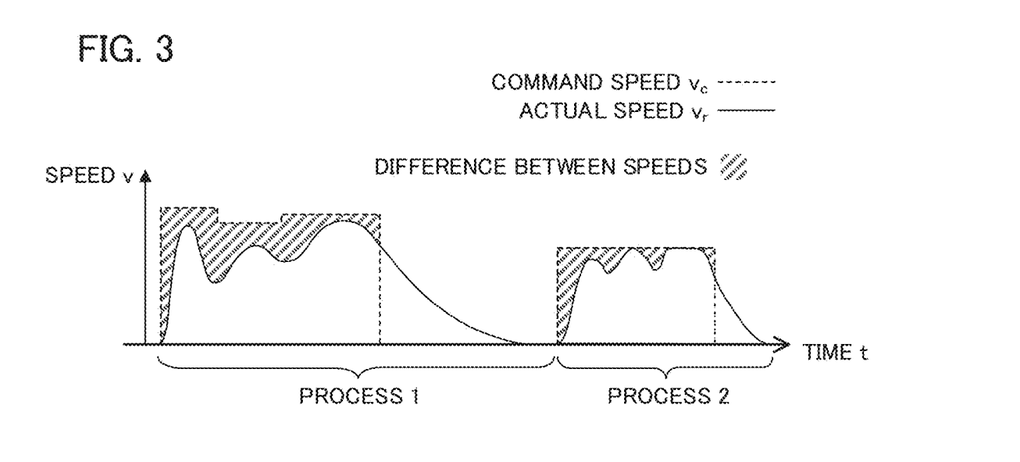
FIG. 3 is a diagram illustrating differences between command speeds and actual speeds.

FIG. 3 is a diagram illustrating the difference between the command speed and the actual speed calculated by the difference calculation unit 140. In FIG. 3, dotted lines, solid lines, and shaded areas represent, respectively, command speeds $v_c$, actual speeds $v_r$, and integral values of the differences between the command speeds $v_c$ and the actual speeds $v_r$ calculated for the individual processes. Thus, the difference calculation unit 140 is characterized in that it not only calculates the difference between the command speed $v_c$ and the actual speed $v_r$ at each time point but also calculates the integral value of the difference for each process.

Figure 4:
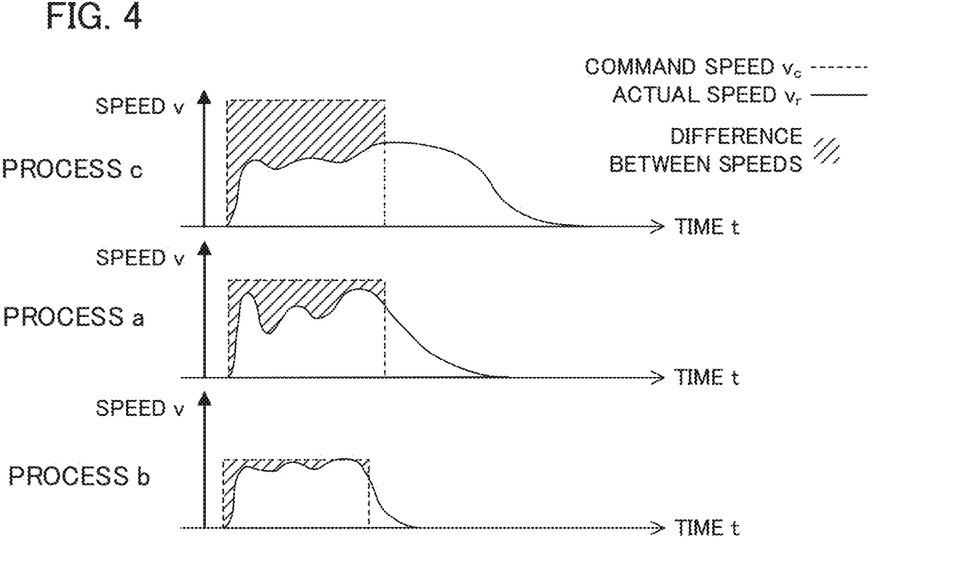
FIG. 4 is a diagram showing an example in which individual processes are sorted in the descending order of integral values of the differences between command speeds $v_c$ and actual speeds $v_r$.

The process sorting unit 150 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The process sorting unit 150 sorts the individual processes in the descending order of the integral values of the differences between the command speeds $v_c$ and the actual speeds $v_r$ calculated by the difference calculation unit 140, based on the integral value of the differences between the command speeds $v_c$ and the actual speed $v_r$. Those processes with a large integral value of the difference between the command speed $v_c$ and the actual speed $v_r$ are assumed to include many improvement factors of some kind such that the command speed $v_c$ is not reached by the actual speed $v_r$. In other words, the order of the processes sorted by the process sorting unit 150 is an order possibly having a high cycle time improvement effect. FIG. 4 shows an example in which the individual processes are sorted by the process sorting unit 150 in the descending order of the integral values of the differences between the command speeds $v_c$ and the actual speeds $v_r$.

FIG. 4 shows process c, process a, and process b in the order of magnitude of the integral value of the difference between the command speed $v_c$ and the actual speed $v_r$. The magnitude of the integral value of the difference between the command speed $v_c$ and the actual speed $v_r$ indicates the level of the cycle time improvement effect.

The result screen creation unit 160 is implemented as the CPU 11 of the program analysis device 1 shown in FIG. 1 executes the system program read out from the ROM 12 and arithmetic processing mainly by the CPU 11 using the RAM 13 and the non-volatile memory 14 and output processing using the interface 18 are performed. The result screen creation unit 160 creates screen data indicative of the integral value of the difference between the command speed $v_c$ and the actual speed $v_r$ in the order of the processes sorted by the process sorting unit 150 and displays the created screen data on the display device 70. The result screen creation unit 160 may create a screen that simply numerically displays the integral value of the difference between the command speed $v_c$ and the actual speed $v_r$ of each process in order. In this case, the operator who has taken a look at the display on the screen can more effectively improve the cycle time by considering an improvement for a plurality of blocks included in processes in higher-order positions.

The result screen creation unit 160 may be designed so as to display the integral value of the difference between the command speed $v_c$ and the actual speed $v_r$ of each process in the form of a graph, as illustrated in FIG. 4. The graphic display is helpful to the operator's intuitive check-up of the improvement point.

Figure 5:
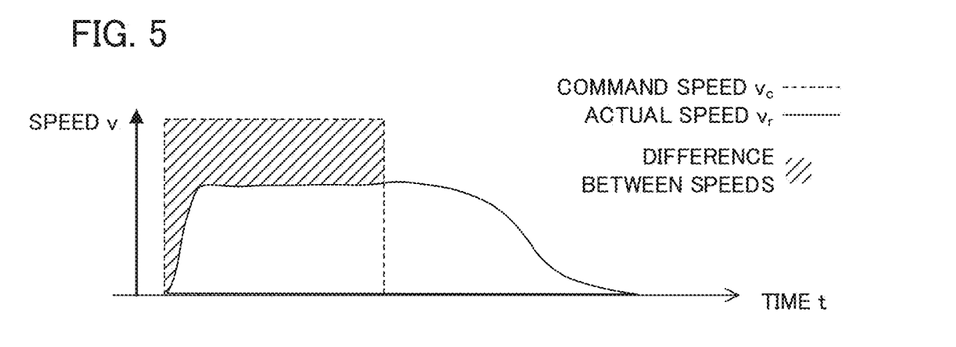
FIG. 5 is a diagram showing an example in which the actual speed $v_r$ reaches a ceiling of a fixed speed and cannot rise up to the command speed $v_c$.

If the actual speed $v_r$ reaches a ceiling of a fixed speed and cannot rise up to the command speed $v_c$ in a specified process, as illustrated in FIG. 5, for example, there may possibly be a problem in the setup of parameters of the maximum speed of the controller. On seeing this, the operator can check up so as to operate the machining program 200 on a controller (machine tool) whose maximum speed can be set higher or make a change to a tool whose maximum speed can be set higher, in order to perform the process more effectively.

Figure 6:
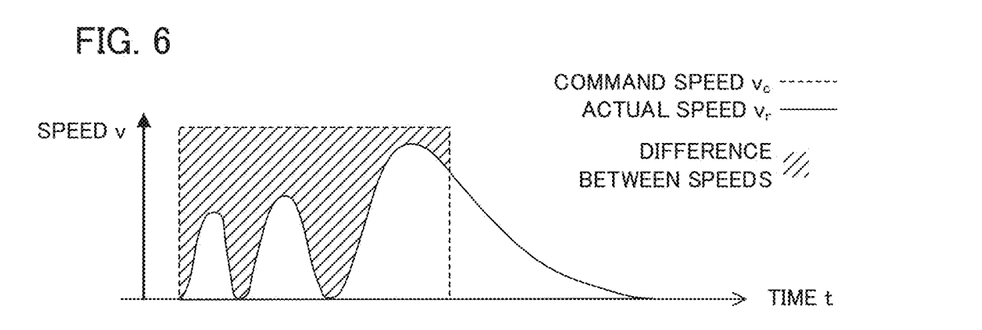
FIG. 6 is a diagram showing an example in which the actual speed $v_r$ cannot rise up to the command speed $v_c$ as a result of repetition of acceleration and deceleration of the actual speed $v_r$.

Moreover, if the actual speed $v_r$ repeats acceleration and deceleration so that the actual speed $v_r$ cannot rise up to the command speed $v_c$ in a specified process, as illustrated in FIG. 6, for example, the machining path used may possibly involve unnecessarily many turnaround points. On seeing this, the operator can consider an improvement such as modification of the machining path commanded by the machining program 200, in order to perform the process more effectively.

The operator can also further check up on a point of improvement with reference to block information on the process, after seeing the displayed graphic integral value. While the actual speed $v_r$ reaches a ceiling of the fixed speed in a part of the process, as illustrated in FIG. 5, for example, information on the blocks at a part where the actual speed $v_r$ reaches a ceiling is referred to if the actual speed $v_r$ is raised close to the command speed $v_c$ at a part. If the blocks at the part where the actual speed $v_r$ reaches a ceiling are then continuous minute blocks, a limit may possibly be reached by the processing capability of the hardware of the controller. On seeing this, the operator can use a higher-performance controller or consider an improvement such as elongation of the path length of each block for the minute block parts of the machining program 200, in order to perform the process more effectively.

The program analysis device 1 according to the present embodiment constructed in this manner displays each process of the machining program after rearranging the order based on the integral value of the difference between the command speed commanded by the machining program and the actual speed. On seeing this display, the operator is enabled to ascertain the processes with great effects of modification at a glance. Moreover, by graphically displaying the integral value of the difference between the command speed and the actual speed, the contents of modification of the machining program can be checked up from the illustrated shape of the integral value of the difference between the command speed and the actual speed.

Figure 7:
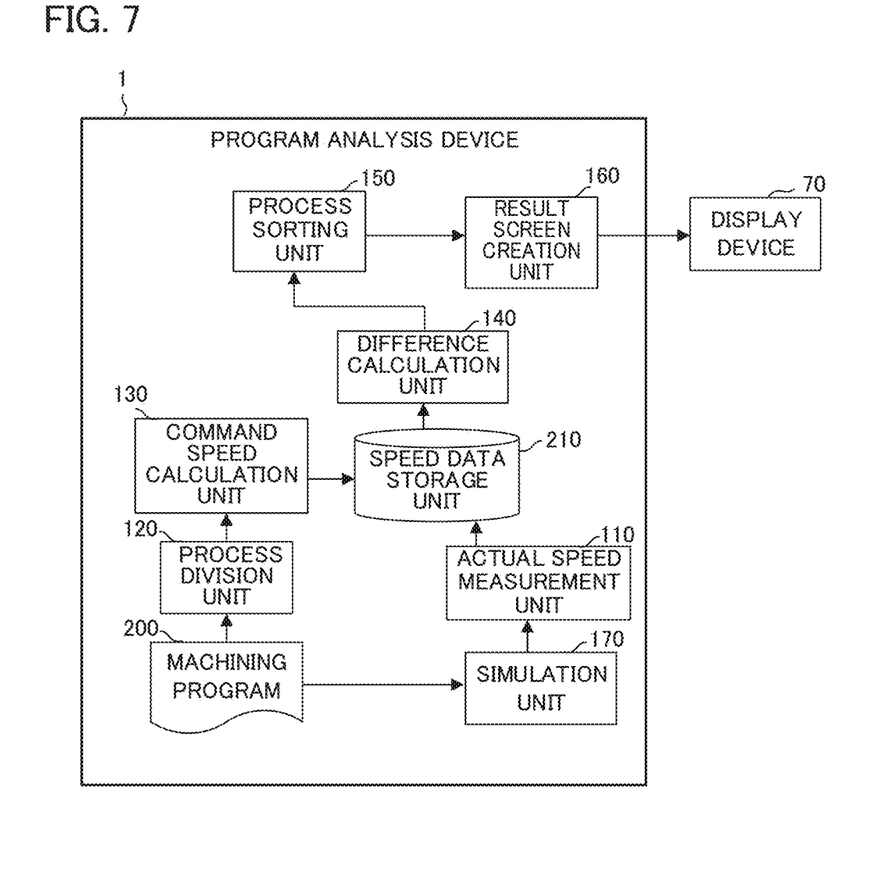
FIG. 7 is a schematic functional block diagram of a program analysis device according to a second embodiment.

FIG. 7 is a schematic block diagram showing functions of a program analysis device 1 according to a second embodiment of the present invention.

The individual functions of the program analysis device 1 according to the present embodiment are implemented as the CPU 11 of the program analysis device 1 shown in FIG. 1 executes the system program and controls the operations of the individual parts of the program analysis device 1.

The program analysis device 1 of the present embodiment includes an actual speed measurement unit 110, process division unit 120, command speed calculation unit 130, difference calculation unit 140, process sorting unit 150, result screen creation unit 160, and simulation unit 170. Moreover, a machining program 200 acquired from the input device 71, external equipment 72, and the like are previously stored in the RAM 13 or the non-volatile memory 14 of the program analysis device 1. Also, the RAM 13 or the non-volatile memory 14 of the program analysis device 1 is provided in advance with a speed data storage unit 210 as an area for storing a command speed commanded by the machining program 200 or storing, as an actual speed, the speed of an axis of the machine tool calculated by simulation processing based on the machining program 200.

The process division unit 120, command speed calculation unit 130, difference calculation unit 140, process sorting unit 150, and result screen creation unit 160 according to the present embodiment share the same functions with the process division unit 120, command speed calculation unit 130, difference calculation unit 140, process sorting unit 150, and result screen creation unit 160, respectively, according to the first embodiment.

The simulation unit 170 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. The simulation unit 170 analyzes the blocks of the machining program 200, performs conventional machining simulation processing based on the result of this analysis, and calculates the moving speed of each axis of a virtual machine tool. Since the simulation processing performed by the simulation unit 170 is already known from, for example, Japanese Patent Application Laid-Open No. 2009-096982 and the like, a detailed description thereof is omitted herein.

The actual speed measurement unit 110 calculates a synthetic speed of the axes, based on the actual speeds of the axes calculated by the simulation unit 170, and stores the calculated synthetic speed of the axes as actual speed data into the speed data storage unit 210. The actual speed measurement unit 110 according to the present embodiment has the same functions as those of the actual speed measurement unit 110 according to the first embodiment except that it handles the speed calculated in the simulation processing by the simulation unit 170 as the actual speed.

The program analysis device 1 according to the present embodiment having the structure described above can calculate an integral value of the difference between the actual speed and the command speed commanded by the machining program, without actually activating a machine tool 2. Therefore, the operator can check up about the contents of modification of the machining program without taking time to actually operate the machine tool. Moreover, the structure can be implemented by using a computer such as a personal computer that is not provided with any mechanism for controlling the machine tool 2.

Figure 8:
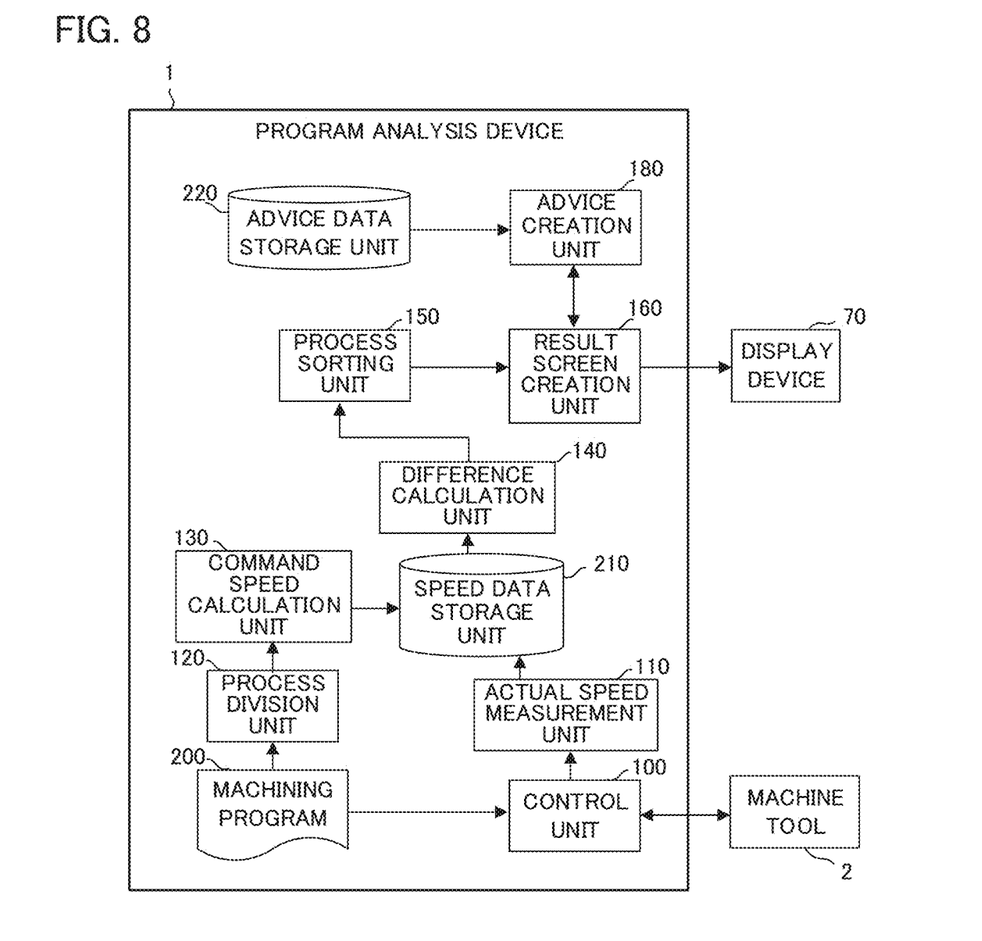
FIG. 8 is a schematic functional block diagram of a program analysis device according to a third embodiment.

FIG. 8 is a schematic block diagram showing functions of a program analysis device 1 according to a third embodiment of the present invention.

The individual functions of the program analysis device 1 according to the present embodiment are implemented as the CPU 11 of the program analysis device 1 shown in FIG. 1 executes the system program and controls the operations of the individual parts of the program analysis device 1.

The program analysis device 1 of the present embodiment includes a control unit 100, actual speed measurement unit 110, process division unit 120, command speed calculation unit 130, difference calculation unit 140, process sorting unit 150, result screen creation unit 160, and advice creation unit 180. Moreover, a machining program 200 acquired from the input device 71, external equipment 72, and the like are previously stored in the RAM 13 or the non-volatile memory 14 of the program analysis device 1. Also, the RAM 13 or the non-volatile memory 14 of the program analysis device 1 is provided in advance with a speed data storage unit 210 as an area for storing a command speed commanded by the machining program 200 and an actual speed of an axis obtained when a machine tool 2 is controlled based on the machining program 200 and an advice data storage unit 220 as an area for previously storing advice data for advising a point of improvement of the machining program 200, individually.

The control unit 100, actual speed measurement unit 110, process division unit 120, command speed calculation unit 130, difference calculation unit 140, process sorting unit 150, and result screen creation unit 160 according to the present embodiment share the same functions with the control unit 100, actual speed measurement unit 110, process division unit 120, command speed calculation unit 130, difference calculation unit 140, process sorting unit 150, and result screen creation unit 160, respectively, according to the first embodiment.

The advice creation unit 180 is implemented as the CPU 11 of the program analysis device 1 shown in FIG. 1 executes the system program read out from the ROM 12 and arithmetic processing mainly by the CPU 11 using the RAM 13 and the non-volatile memory 14 is performed. When graphic display of an integral value of the difference between a command speed $v_c$ and an actual speed $v_r$ of each process as display data is created by the result screen creation unit 160, the advice creation unit 180 selects an advice for a point of improvement of the machining program 200, based on the shape of the graph of the integral value, and outputs it to the result screen creation unit 160. The advice creation unit 180 performs processing for pattern matching with the advice data stored in the advice data storage unit 220, using the known pattern matching technology, for the shape of the graph of the integral value, for example, and selects an advice included in the matched advice data and outputs it to the result screen creation unit 160. The advice creation unit 180 may be designed so as to create the advice by performing the pattern matching in combination with processing of another type (e.g., analysis of blocks in each process).

Figure 9:
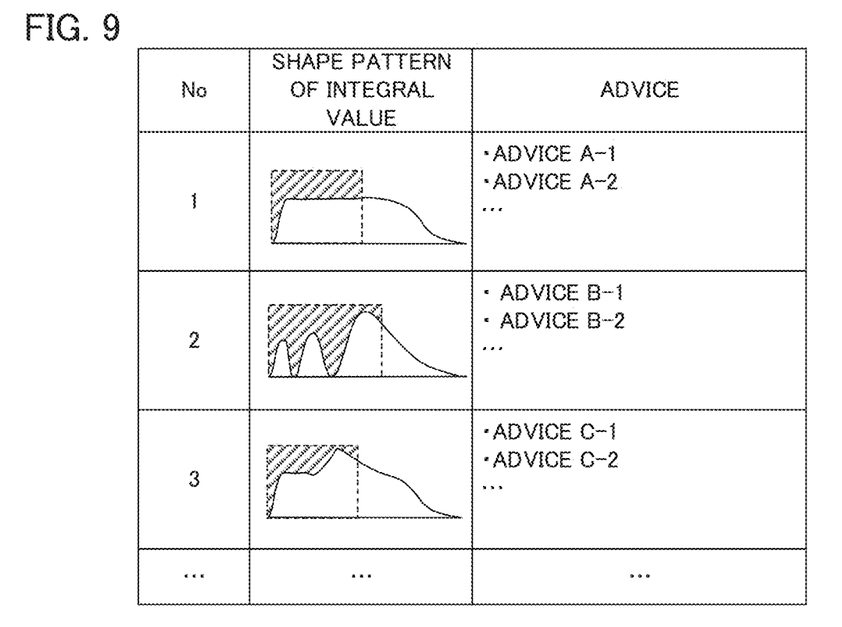
FIG. 9 is a diagram showing an example of advice data.

FIG. 9 shows an example of the advice data stored in the advice data storage unit 220.

In the example of FIG. 9, the advice data stored in the advice data storage unit 220 are formed of advice sentences associated with shape patterns of the integral value. If the shape of the graph of the integral value created by the result screen creation unit 160 is matched, from the viewpoint of patterns, with advice data 1 for a certain process, the advice creation unit 180 outputs advices A-1, A-2, . . . (e.g., "CONSIDER CHANGE TO CONTROLLER OR MACHINE TOOL ADAPTED FOR HIGHER MAXIMUM SPEED", "CONSIDER CHANGE TO TOOL ADAPTED FOR HIGHER MAXIMUM SPEED", and the like), as advices included in the advice data, to the result screen creation unit 160. Additional analysis contents and advice sentences associated with the result of the analysis may be incorporated into the advices included in the advice data. In this case, analysis processing corresponding to the additional analysis contents may be performed by the operator or automatically by the advice creation unit 180.

The result screen creation unit 160 displays the advices created by the advice creation unit 180 in a manner such that they are associated with the sequentially arranged processes.

The program analysis device 1 according to the present embodiment constructed in this manner can calculate the integral value of the difference between the actual speed and the command speed commanded by the machining program for each process and advice a point of improvement of the process based on the shape of the graph of the calculated integral value. The operator is enabled to check up about the contents of modification of the machining program with reference to the advice of the point of improvement, of the process displayed by the program analysis device 1.

While embodiments of the present invention have been described above, the invention is not limited to the examples of the above-described embodiments and may be suitably modified and embodied in various forms.

Figure 10:
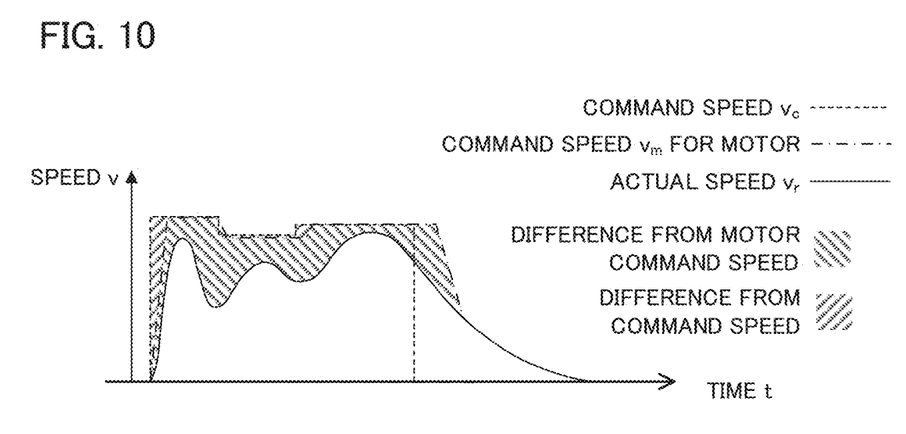
FIG. 10 is a diagram illustrating differences between a command speed or a motor command speed and an actual speed.

For example, the point of improvement of the machining program is assumed to be checked up based on the integral value of the difference between the command speed and the actual speed in the embodiments described above. However, integral values of differences between the actual speeds and command speeds such as motor command speeds calculated in the controller, besides the command speed from the machining program, may be calculated so that the above-described pieces of processing can be performed based on the calculated integral values, as illustrated in FIG. 10. The command speeds calculated in the controller individually have different meanings from the viewpoint of control, and the operator can consider a more appropriate point of improvement of the machining program with reference to the meanings. Also, an advice can be given to designate parts to be improved, based on the shape patterns of the integral values of the differences between those individual speeds. By way of example, the integral value of the difference between the motor command speed and the actual speed is compared with the integral value of the difference between the program command speed and the actual speed. If the integral value of the difference between the motor command speed and the actual speed is found to be greater as a result of the comparison, the adjustment of the motor or the machine can be supposed to be insufficient, so that an advice can be given to induce an operator to adjust the motor gain.

Figure 11:
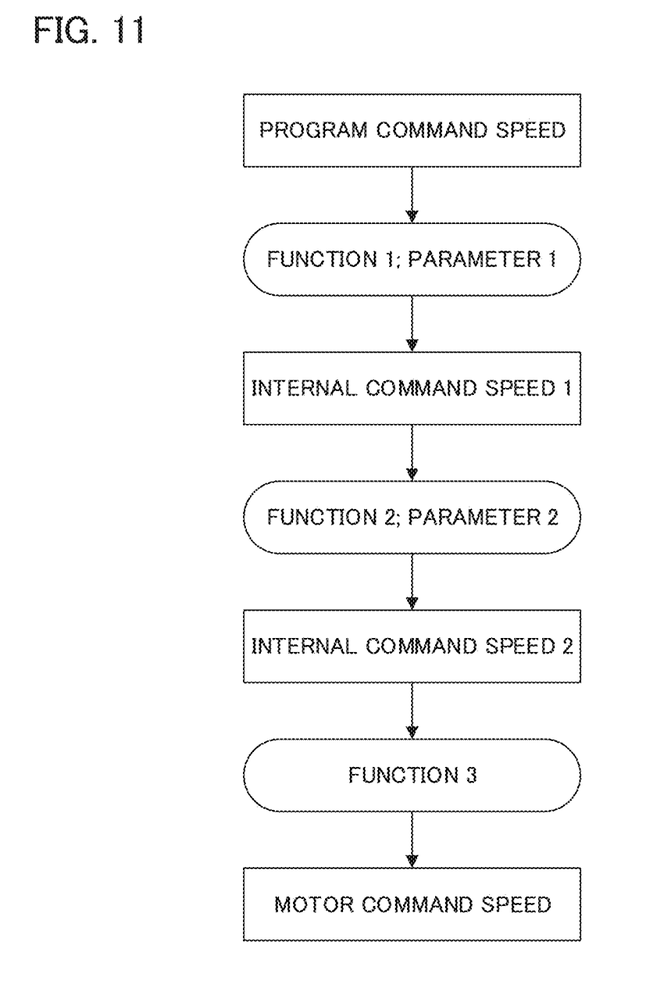
FIG. 11 is a diagram illustrating a flow of speed arithmetic processing in a controller.

The above-described calculation of the integral value of the difference between the speeds calculated in the controller may be further performed in a multistage manner in accordance with the functions of the controller. As illustrated in FIG. 11, the controller calculates the motor command speed by gradually applying functions (including relevant parameters) to program commands. Therefore, the operator can identify internal command speeds with great differences from the actual speed by graphically displaying the integral values of the differences between the actual speed and the individual internal command speeds calculated in the controller and consider improvement of the relevant functions and parameters. Moreover, an advice can be given for a point of improvement of functions and parameters to be reviewed and the way of the reviewing, based on the shape patterns of the integral values of the differences between the actual speed and the individual internal command speeds calculated in the controller.

The invention claimed is:

1. A program analysis device configured to obtain a difference between a command speed commanded by a machining program for an axis of a machine to be controlled and an actual speed of the axis obtained when the machining program is executed, for each process composed of a plurality of blocks in the machining program, the program analysis device comprising:
   a process division unit configured to divide the machining program into processes;
   a command speed calculation unit configured to obtain the command speed from the machining program for each of the processes obtained by the division by the process division unit;
   an actual speed measurement unit configured to measure the actual speed of the axis for each of the processes obtained when machining based on the machining program is performed;
   a difference calculation unit configured to calculate, for each of the processes, an integral value of the difference between the command speed obtained by the command speed calculation unit and the actual speed measured by the actual speed measurement unit;
   a process sorting unit configured to rearrange an order of the processes based on the integral value of the difference between the command speed and the actual speed for each of the processes calculated by the difference calculation unit; and
   a result screen creation unit configured to create screen data for displaying the processes in the order sorted by the process sorting unit.

2. The program analysis device according to claim 1, wherein the result screen creation unit displays the integral value of the difference between the command speed and the actual speed for each of the processes in the form of a graph displaying the processes in the order sorted by the process sorting unit.

3. The program analysis device according to claim 1, further comprising a simulation unit configured to simulate a movement of the axis of the machine caused when the machining program is executed, wherein the actual speed measurement unit regards a speed of the axis calculated by the simulation unit as the actual speed.

4. The program analysis device according to claim 2, further comprising an advice creation unit configured to create an advice for a point of improvement of the machining program, based on the integral value of the difference between the command speed and the actual speed for each of the processes in the form of the graph created by the result screen creation unit.

* * * * *